United States Patent [19]

Miller

[11] Patent Number: 5,139,303

[45] Date of Patent: Aug. 18, 1992

[54] SUNVISOR SPRING CLIP AND ATTACHMENT MECHANISM

[75] Inventor: Douglas C. Miller, Hersey, Mich.

[73] Assignee: Plasta Fiber Industries, Inc., Marlette, Mich.

[21] Appl. No.: 730,700

[22] Filed: Jul. 16, 1991

[51] Int. Cl.$^5$ .............................................. B60J 3/02
[52] U.S. Cl. .................................. 296/97.9; 296/97.12
[58] Field of Search ................... 296/97.9, 97.12, 97.1

[56] References Cited

U.S. PATENT DOCUMENTS

| | | | |
|---|---|---|---|
| 4,070,054 | 1/1978 | Cziptschirsch | 296/97.9 |
| 4,428,612 | 1/1984 | Viertel et al. | 296/97.12 |
| 4,469,367 | 9/1984 | Kuttler et al. | 296/97.9 |
| 4,617,699 | 10/1986 | Nakamura | 296/97.9 |
| 5,054,839 | 10/1991 | White et al. | 296/97.1 |

Primary Examiner—Robert R. Song
Attorney, Agent, or Firm—Brooks & Kushman

[57] ABSTRACT

A mechanism and method for attaching a sunvisor to a pivot shaft by providing a generally U-shaped clip having first and second arms within a cooperating clip housing integrally formed within the rear panel of the sunvisor. A conduit is formed by the spring clip enabling the sliding of the pivot shaft into both the clip housing and the spring clip. The clip housing is designed to cooperate with the pivot shaft to pre-stress one arm of the spring clip, thereby eliminating excess play between the spring clip and the sunvisor when the visor is pivoted. The attachment mechanism is designed such that a snap-shut hook is properly received within a receiving hook, thereby effectively securing the sunvisor to the pivot shaft.

17 Claims, 2 Drawing Sheets

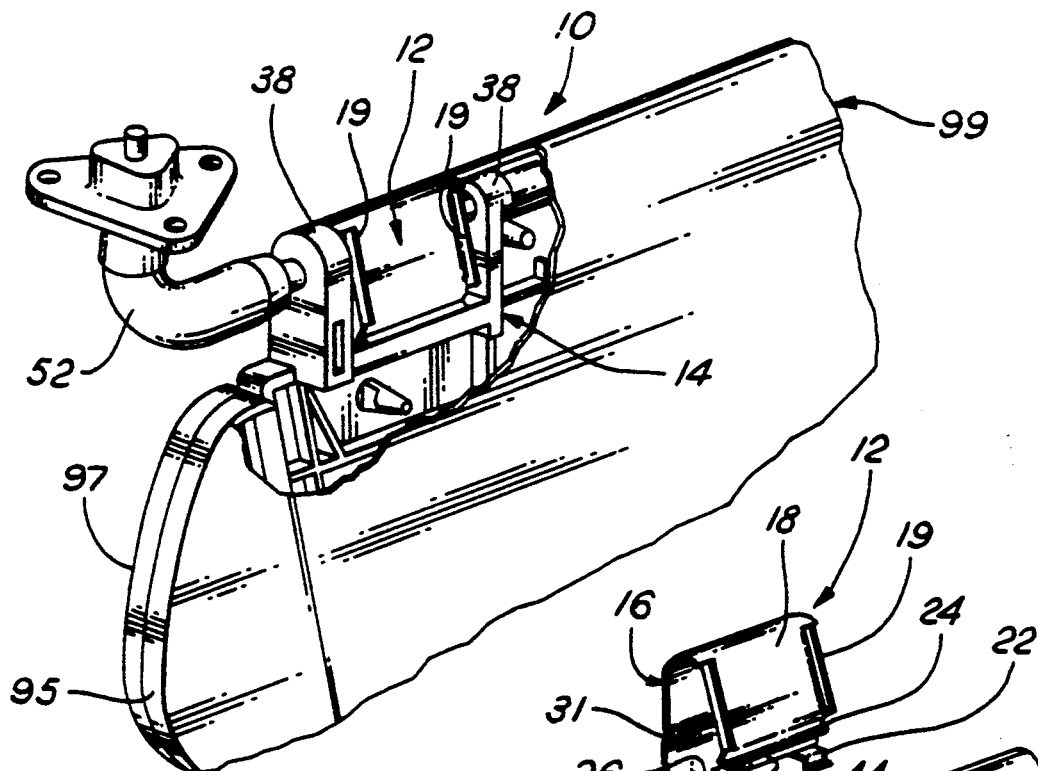
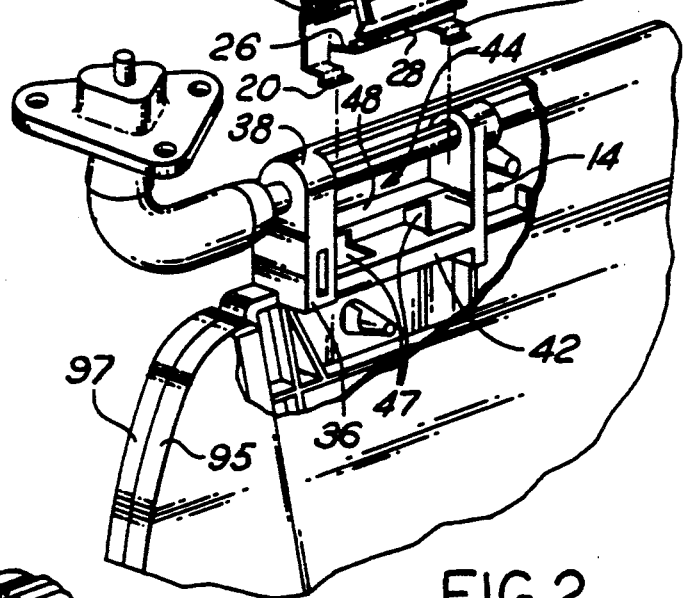
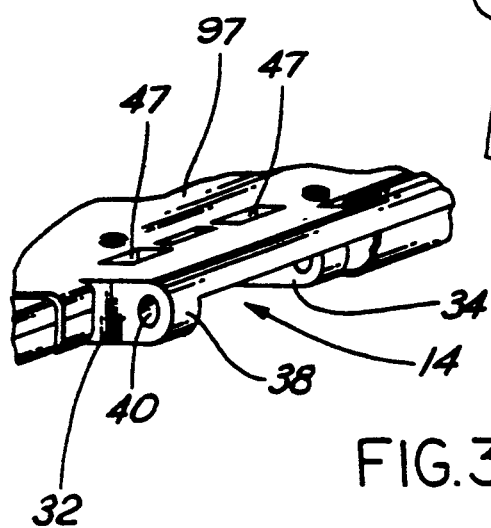
FIG. 1
FIG. 2
FIG. 3

SUNVISOR SPRING CLIP AND ATTACHMENT MECHANISM

TECHNICAL FIELD

This invention relates to sunvisors and, in particular, to methods and mechanisms for attaching a vehicle sunvisor to a pivot shaft.

BACKGROUND ART

The present invention relates to automobile sunvisors, particularly to the attachment mechanism for securing a sunvisor to a pivot shaft.

Conventional pivot shafts are generally circular having one flat side to provide a detent position for the attachment mechanism. The flat side of the pivot shaft cooperates with the attachment mechanism to enable the sunvisor to securely remain in the stored position. The present invention incorporates this use of a pivot shaft having a detent position.

Traditionally, sunvisor spring clips have been seated rather loosely within the visor body causing an undesired amount of noise in the form of clicking or snapping upon movement of the sunvisor. Numerous approaches have been taken to alleviate the problem. The most common approach involves the use of separate fasteners, such as rivets to secure the clip to the body of the visor. An example of another approach, U.S. Pat. No. 4,428,612 to Viertel et al discloses a swivel mount including a mount housing cooperating with a detent spring which is wrapped around a sunvisor mounting shaft for aiding in the mounting of a sunvisor body. The detent spring includes two arms which extend from the web of the spring. The detent spring is mounted on the mounting shaft with the aid of an end stop which, in combination with the arms of the detent spring, forms a clip connection. In this construction, the detent spring relies upon the interaction of both arms with the end stop to provide a secure fit. In addition, the detent spring does not include a fastening means for connecting the two arms to form a clip connection, instead relies upon one arm hooking over the end stop to form the clip connection.

U.S. Pat. No. 4,469,367 to Kuttler discloses another clamping spring which wraps around a mounting shaft for a sunvisor. The U-shaped spring includes a web which is wrapped around the mounting shaft and arms extending from the web. The ends of the arms include an inwardly facing hook and hooking edge that are hooked together in tension during the mounting of the sunvisor. However, this design relies on close tolerances between the bottom arms of the clip and a support member between them to minimize snapping and clicking noises.

The present invention incorporates all of the known benefits of clip supports for sunvisors while improving the overall attachment mechanism.

SUMMARY OF THE INVENTION

The present invention in a sunvisor spring clip and attachment mechanism has a housing cooperating with a spring clip to pivotally secure a sunvisor to the pivot shaft. The spring clip is seated within the housing in a manner enabling the spring clip to be pre-stressed, insuring a secure and noiseless attachment when the spring clip is in the closed position and the sunvisor is connected to the pivot shaft.

Accordingly, an object of the present invention is to provide a relatively inexpensive attachment mechanism for securing a sunvisor to a pivot shaft to eliminate undesired noise.

Another object of the present invention is to provide an improved attachment mechanism for securely attaching a sunvisor to a pivot shaft while enabling pivotal movement thereof.

A specific object of the present invention is to provide an improved attachment means for pivotally securing a sunvisor to a pivot shaft. A sunvisor includes a plastic shell having front and rear panels. A clip housing is integrally formed within one panel of the sunvisor and adapted to be interposed between the pivot shaft and the sunvisor once the front and rear panels are joined. A spring clip is provided to cooperate with the clip housing to provide a conduit on the sunvisor to receive the pivot shaft. Means including the clip housing and the pivot shaft pre-stress the spring clip to eliminate excess play between the spring clip and the sunvisor when the sunvisor is pivoted.

Another object of the present invention is to provide a method of attaching a sunvisor to a pivot shaft by providing a generally U-shaped spring clip having first and second arms within a cooperating clip housing. The method ensures that the spring clip is tipped at an angle to enable at least one tail to be created along the free end of one of the arms of the spring clip which is positioned near a slot in a base located within the clip housing. Then the tail or plurality thereof is mated with the cooperating slots by moving the spring clip to the upright position. Next, the pivot shaft is slid into both the clip housing and the spring clip, thereby forcing the spring clip to rest against a plurality of bosses located at the tail and at a position along the same arm of the spring clip to securely anchor one arm while allowing the second arm having a snap-shut hook at its free end to remain open, thereby pre-stressing one arm of the spring clip away from the inner surface of the rear panel and eliminating excess play between the spring clip and the sunvisor when the sunvisor is pivoted. Finally, pressing the snap-shut hook and the second arm is pressed toward the receiving hook on the first arm for receiving the snap-shut hook and ensuring that the snap-shut hook is properly received within the receiving hook, thereby effectively securing the sunvisor to the pivot shaft.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of the attachment mechanism in accordance with the present invention, partially broken away showing the spring clip seated within the housing;

FIG. 2 is an exploded perspective view similar to that shown in FIG. 1, partially broken away showing the spring clip removed from within the housing;

FIG. 3 is another perspective view of the housing's spring slip mounting area with the clip removed;

BEST MODE FOR CARRYING OUT THE INVENTION

Figure 4:
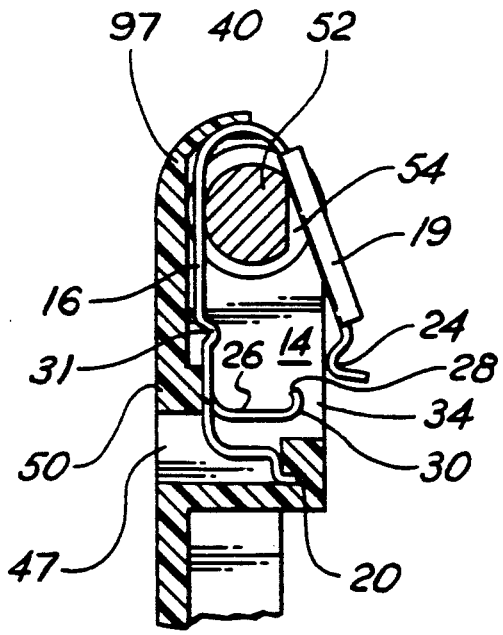
FIG. 4 is an end view partially in cross-section showing the spring clip and pivot arm installed within the housing prior to snapping shut the clip.

Referring to FIGS. 1 through 5, FIG. 1 illustrates an improved sunvisor attachment mechanism, generally indicated at 10, including a spring clip, generally indicated at 12 and a clip housing, generally indicated at 14. The sunvisor 99 is formed of a front panel 95 and a rear panel 97.

The spring clip 12 is generally U-shaped having a first arm 16 and a second arm 18. In this embodiment, as shown in FIG. 1, two L-shaped tails 20 and 22 are located at the free end of the first arm 16. The tails 20 and 22 are situated in longitudinal alignment at opposite ends of the free end of the first arm 16.

The U shape is formed by the connection of the first arm 16 to the second arm 18. A snap-shut hook 24 having an obtuse angled opening is located at the free end of the second arm 18. This snap-shut hook 24 mates with a receiving hook 26 located above and in parallel alignment with the tails 20 and 22 on the first arm 16. The receiving hook 26 has a upwardly turned hook 28 at its free end 30 which mates with the snap-shut hook 24 to ensure a secure closure of the spring clip 12. The first arm 16 has one or more transverse ridges 31 (one shown in this embodiment) which provide additional stiffness to the first arm 16. This increased stiffness minimizes downward flexing of the first arm 16 onto the flat side 54 of the pivot shaft 52 thereby eliminating an undesirable second detent position normally present to some degree in most detent type sunvisors.

The second arm 18 has its two lateral edges 19 curled outward, away from the first arm 16 to provide additional stiffness. This additional stiffness forces the wider first arm 16 to flex during rotation of the sunvisor 99 providing the spring clip 12 with increased torque and longer life.

The housing 14 is formed of two side portions 32 and 34 each having the identical shape and structure, therefore the description of one side portion 32 will serve to describe the other side portion 34. With reference to FIGS. 2 and 3, side portion 32 is generally key-hole shaped or generally rectangular having a base 36 and a round top 38. A hole 40 is located near the top 38 of the side portion 32 and extends through the side portion 32 and is centrally located along the width of the side portion 32.

A front portion 42 is connected to the two side portions 32 and 34 at a location just above the base 36 to form a single unit. The front portion 42 is generally T-shaped lying in a horizontal position with the top of the "T" connecting the two side portions 32 and 34. Two slots 46 in cutouts 47 (FIGS. 2, 3, and 5A) are located along the inner surface of the front portion 42 which mate with the two tails 20 and 22 respectively. The remainder of the inner surface above the slots 46 forms a boss 48. A similar boss 50 is located along the inner surface of the rear panel 97 which forms the rear portion 44 of the clip housing 14.

Figure 5A:
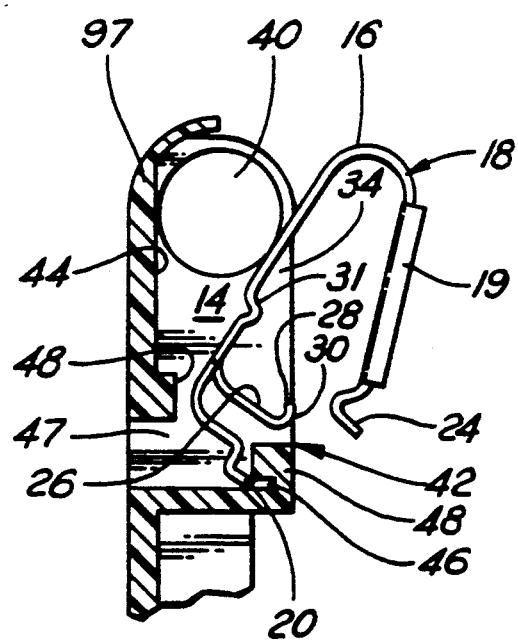
FIGS. 5A–5C are end views partially in cross-section showing the installation of the spring clip and pivot arm within the housing.
Figure 5B:
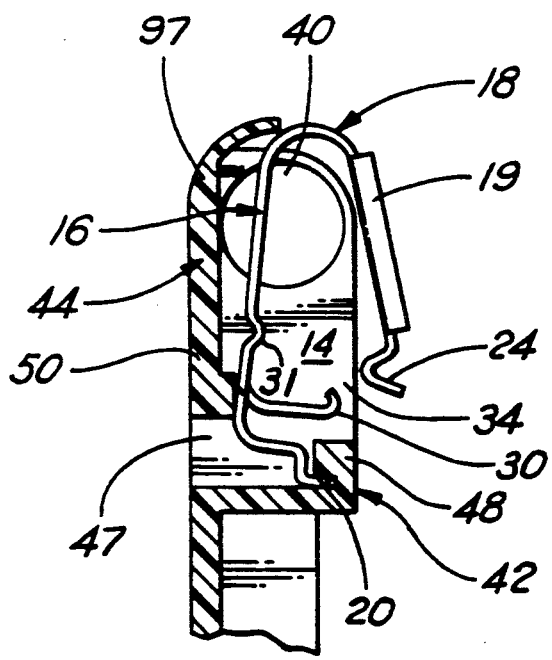
Figure 5C:
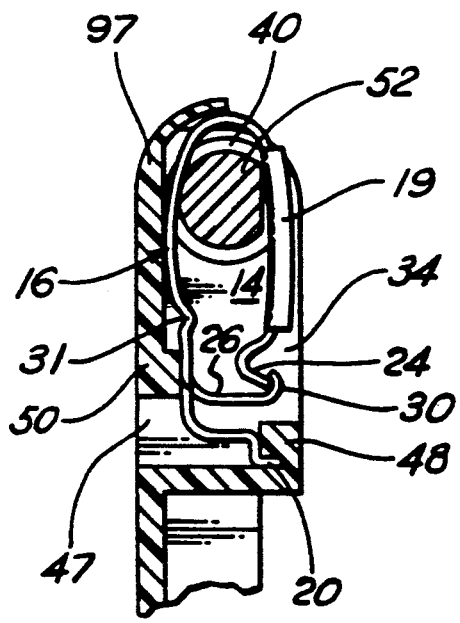

To install a sunvisor 99 using the attachment mechanism 10, requires the following procedure shown in FIG. 5A–5C. The spring clip 12 is tipped such that the receiving hook 26 is angled slightly downward (as shown in FIG. 5A) enabling the tails 20 and 22 of the spring clip 12 to fit between the two bosses 48 and 50 on the front and rear portions 42 and 44 of the housing respectively (as shown in FIG. 5B). The spring clip is then pivoted to a near vertical position such that the two tails 20 and 22 mate with the slots 46 and the upper portion of the two tails 20 and 22 at the attachment juncture of the receiving hook 26 along the first arm 16, abuts the boss 50 of the rear portion 44 (as shown in FIG. 5B), thereby preventing the first arm 16 from achieving a fully vertical or prestressed position.

Next, a D-shaped pivot shaft 52 which is generally circular in shape but having one flat side 54 as a visor positioning device, is slid through the clip housing 14 and the spring clip 12 via hole 40 in both side portions 32 and 34 (FIGS. 2 and 3). The spring clip 12 is now secured within the clip housing 14 and the first arm 16 of spring clip 12 is pre-stressed by the pivot shaft over the boss 50 in view of the entrapment of tails 20,22 in slots 46. The pre-stress eliminates excess play between the spring clip 12, housing 14 and pivot shaft 52 when the sunvisor 99 is pivoted. The second arm 18 is then pushed toward the first arm 16 until the snap-shut hook 24 is received within the receiving hook 26 in the first arm 16 thereby effectively securing the sunvisor 99 to the pivot shaft 52.

Although a particular embodiment of the present invention has been illustrated in the accompanying drawings and described in the foregoing detailed description, it is to be understood that the present invention is not to be limited to just the embodiment disclosed. Numerous rearrangements, modifications and substitutions are possible without departing from the scope of the claims hereafter.

What is claimed is:

1. An improved attachment means for pivotally securing a vehicular sunvisor to a pivot shaft, comprising:
    a sunvisor including a shell having joinable front and rear panels;
    a clip housing integrally formed with a biasing means within one panel of the sunvisor and adapted to receive the pivot shaft for securing the sunvisor once the front and rear panels have been joined;
    a spring clip cooperating with the clip housing to provide a conduit on the sunvisor to receive the pivot shaft and having a first arm and a free end adapted to be anchored within the clip housing; and
    means including the biasing means and the pivot shaft when the pivot shaft is received in the clip housing and the free end of the spring clip is anchored for pre-stressing the first arm of the spring clip to eliminate excess play between the spring clip and the clip housing when the sunvisor is pivoted.

2. The attachment means of claim 1 wherein the pivot shaft further comprises a generally circular shape having at least one flat side to provide a detent position for the visor.

3. The attachment means of claim 1 wherein the clip housing further comprises a front portion and a rear portion integrally defined by the rear panel;
    the front portion having a first boss and the rear portion having a second boss as the biasing means; and
    a slot within at least one of the bosses for anchoring the free end when the spring clip is cooperating with the clip housing.

4. The attachment means of claim 3 wherein the spring clip has a second arm generally forming a U-shaped unit with the first arm;

one of the arms having a snap-shut hook and the other of the arms having a receiving hook at their respective free ends, the snap-shut hook cooperating with the receiving hook for securing the pivot shaft between the arms; and the spring clip having at least one tail formed along the free end to secure the spring clip when anchored within the clip housing.

5. The attachment means of claim 4 wherein the pivot shaft has a generally circular shape having at least one flat side to provide a detent position for the visor and wherein one of the arms of the spring clip has one or more transverse ridges to stiffen the spring clip to eliminate a second detent position.

6. The attachment means of claim 4 wherein one of the arms has curled lateral edges, each of the curled lateral edges is curled outwardly away from the other arm to stiffen the spring clip, thereby increasing the torque of the spring clip.

7. The attachment means of claim 1 wherein the pre-stressing means further comprises a tail on the free end of the spring clip cooperating with the clip housing to anchor the spring clip and the biasing means comprises a boss on the clip housing for biasing the first arm away from the clip housing when the pivot shaft is received in the spring clip such that the first arm is pre-stressed with respect to both the clip housing and the pivot shaft, thereby eliminating excess play between the spring clip, the clip housing and the pivot shaft when the sunvisor is pivoted.

8. The method of attaching a sunvisor to a pivot shaft comprising the steps of:
  placing a generally U-shaped spring clip having a first and second arm in a cooperating clip housing, ensuring that the spring clip is tipped at an angle to enable at least one tail located along the free end of one of the arms of the spring clip to be positioned near an equal number of slots in a boss located within the clip housing;
  mating the tail or plurality thereof with the cooperating slots by moving the spring clip to the upright position;
  forcing the spring clip to rest against a plurality of bosses located at the tail and at a position along the same arm of the spring clip;
  sliding the pivot shaft into both the housing and a conduit formed by the spring clip, thereby pre-stressing one arm of the spring clip between the pivot shaft and the bosses and eliminating excess play between the spring clip and the housing;
  pressing the snap-shut hook and the second arm toward a receiving hook on the first arm for receiving the snap-shut hook, ensuring the snap-shut hook is properly received within the receiving hook, thereby pre-stressing the second arm against the pivot shaft; and
  securing the sunvisor to the pivot shaft while eliminating excess play between the pivot shaft and the sunvisor when the sunvisor is pivoted.

9. An improved spring clip for use with a vehicular sunvisor having a clip housing portion and a boss to pivotally secure the sunvisor to a pivot shaft, the spring clip comprising:
  a first member and a second member generally forming an integral U-shaped unit having an attachment end and a free end selectively engageable to pre-stress the clip and pivotally secure the sunvisor to the pivot shaft;
  one of the attachment end or free end having a hook and the other of the attachment end or free end having a catch for receiving the hook when the attachment end and the free end are engaged; and
  at least one tail on the attachment end engageable with the clip housing portion for securing the spring clip to the clip housing portion;
  the tail of the spring clip cooperable with the clip housing portion when the tail is engaged with the clip housing portion and the attachment end and the free end are engaged with each other and the attachment end is engaged with the boss such that the spring clip is secured to the clip housing means and the spring clip is pre-stressed, thereby to pre-stress the pivot shaft with respect to the sunvisor to eliminate excess play between the pivot shaft and the sunvisor when the sunvisor is pivoted on the pivot shaft.

10. The spring clip of claim 9 wherein the spring clip further comprises a flexible material enabling pivotal rotation while securely fastening the sunvisor on the pivot shaft.

11. The spring clip of claim 9 wherein the pivot shaft has a generally circular shape having at least one flat side to provide a detent position for the visor and wherein one of the members has one or more transverse ridges to stiffen the spring clip to eliminate a second detent position.

12. The spring clip of claim 9 wherein one of the members has curled lateral edges, each of the curled lateral edges is curled outward away from the other member to stiffen the spring clip, thereby increasing the torque of the spring clip.

13. An improved spring clip for use with a vehicular sunvisor having a clip housing portion and a boss to pivotally secure the sunvisor to a pivot shaft, the spring clip comprising:
  a first member and a second member generally forming an integral U-shaped unit having an attachment end and a free end selectively engageable to pre-stress the clip and pivotally secure the sunvisor to the pivot shaft;
  one of the attachment end or free end having a hook and the other attachment end or free end having a catch for receiving the hook when the attachment end and the free end are engaged;
  one of the members having one or more transverse ridges to stiffen the spring clip to eliminate a second detent position; and
  at least one tail on the attachment end engageable with the clip housing portion for securing the spring clip to the clip housing portion;
  the tail of the spring clip cooperating with the clip housing portion when the tail is engaged with the clip housing portion and the attachment end and the free end are engaged with each other and the attachment end is engaged with the boss such that the spring clip is pre-stressed, thereby pre-stressing the pivot shaft with respect to the sunvisor to eliminate excess play between the pivot shaft and the sunvisor when the sunvisor is pivoted on the pivot shaft.

14. The spring clip of claim 13 wherein the spring clip further comprising a flexible material enabling pivotal rotation while securely fastening the sunvisor on the pivot shaft.

15. An improved spring clip for use with a vehicular sunvisor having a clip housing portion and a boss to pivotally secure the sunvisor to a pivot shaft, the spring clip comprising:

a first member and a second member generally forming an integral U-shaped unit having an attachment end and a free end selectively engageable to pre-stress the clip and pivotally secure the sunvisor to the pivot shaft;

one of the attachment end or free end having a hook and the other of the attachment end or free end having a catch for receiving the hook when the attachment end and the free end are engaged;

one of the members has curled lateral edges, each of the curled lateral edges is curled outward away from the other member to stiffen the spring clip, thereby increasing the torque of the spring clip; and at least one tail on the attachment end engageable with the clip housing portion for securing the spring clip to the housing portion;

the tail of the spring clip cooperating with the clip housing portion when the tail is engaged with the clip housing portion and the attachment end and the free end are engaged with each other and the attachment end is engaged with the boss such that the spring clip is secured to the clip housing means and the spring clip is pre-stressed, thereby pre-stressing the pivot shaft with respect to the sunvisor to eliminate excess play between the pivot shaft and the sunvisor when the sunvisor is pivoted on the pivot shaft.

16. The spring clip of claims 13 or 15 wherein the spring clip further comprising a flexible material enabling pivotal rotation while securely fastening the sunvisor on the pivot shaft.

17. The method of attaching a sunvisor to a pivot shaft comprising the steps of:

placing a generally U-shaped spring clip having a first and second arm and tail on the first arm in a cooperating clip housing having a boss and slot;

tipping the spring clip at an angle to enable the tail to be positioned near the slot;

mating the tail with the slot by moving the spring clip to the upright position;

forcing first arm of the spring clip into the clip housing against the boss;

sliding the pivot shaft into the clip housing between the first and second arms of the spring clip, while pre-stressing the first arm of the spring clip against the boss of the clip housing to eliminate excess play between the spring clip, the pivot shaft and the clip housing; and locking the first arm to the second arm with the pivot shaft therebetween to secure the sunvisor to the pivot shaft.

* * * * *